United States Patent

[11] 3,568,656

[72] Inventor Bedrich V. Bliznak
 177 Mutval St., Toronto 2, Ontario, Canada
[21] Appl. No. 808,495
[22] Filed Mar. 19, 1969
[45] Patented Mar. 9, 1971

[54] GRINDING-WHEEL DRESSER
 7 Claims, 5 Drawing Figs.
[52] U.S. Cl. .................................................. 125/11
[51] Int. Cl. .................................................. B24b 53/00
[50] Field of Search .................................... 125/11, 39

[56] References Cited
 UNITED STATES PATENTS
 887,059  5/1908  Belden ........................ 125/11
 2,341,820  2/1944  Schoger ...................... 125/11
 2,347,280  4/1944  Petue ......................... 125/11

OTHER REFERENCES
American Machinist, Sept. 16, 1963, Vol 107, No. 19, p159

*Primary Examiner*—Harold D. Whitehead
*Attorney*—Edmond F. Shanahan

ABSTRACT: A dressing tool for manually correcting a grinding-wheel surface; the tool is comprised of a positioning block which is formed with right-angle locating surfaces seating on the tool rest table, and a feed screw with cutting diamonds mounted in its end; the latter passes through a smooth bore in the block, extending from its inboard and outboard surfaces; the screw is clamped in position by means of a pair of nuts, an inboard but integral with the block, and an outboard nut threadably received on the screw and releasably movable into clamping position against the outboard surfaces of the positioning block.

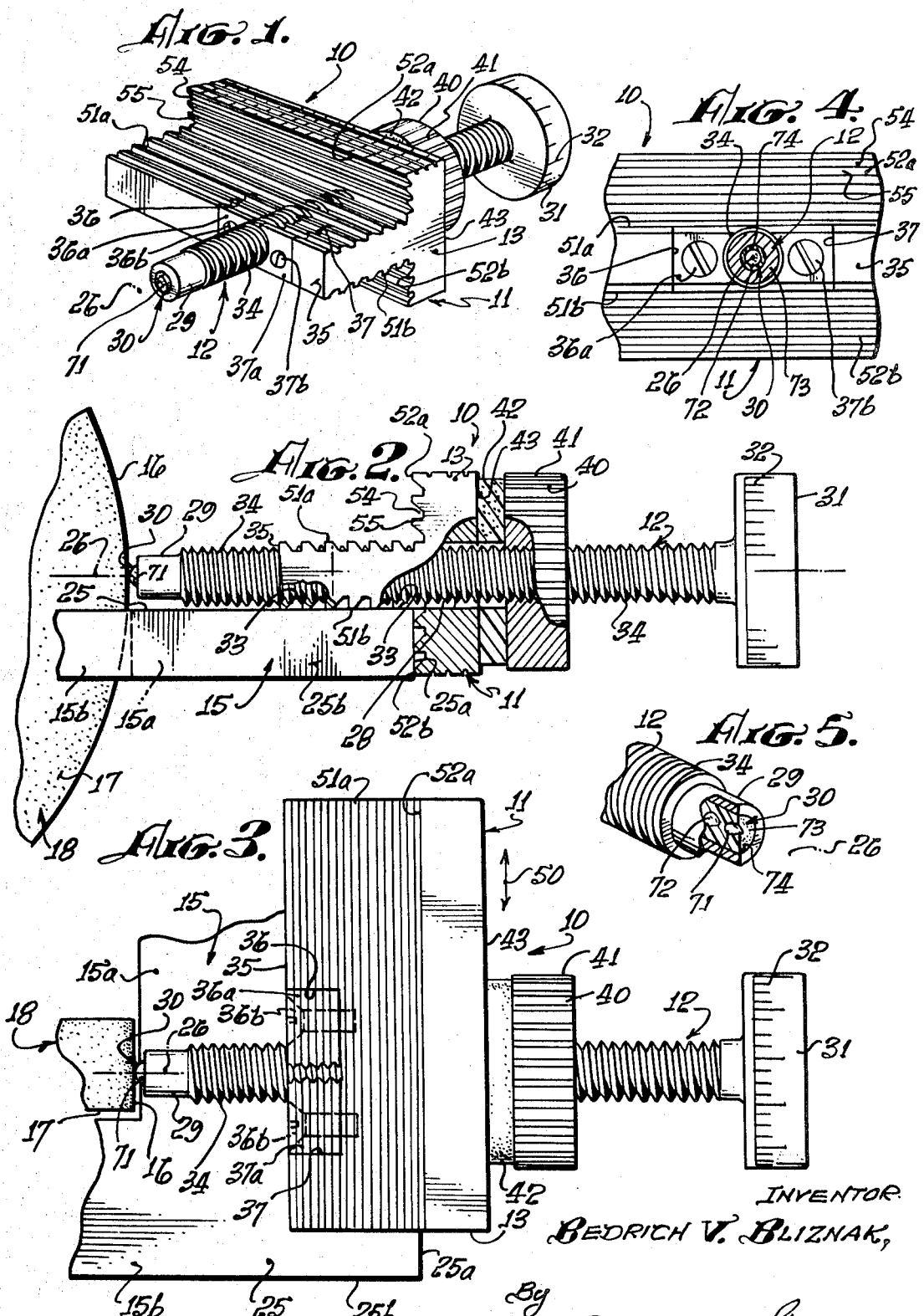

GRINDING-WHEEL DRESSER

This invention relates generally to manually applied dressing tools for grinding wheels, and more particularly to a dressing tool comprised of a positioning block and a diamond-bearing feed screw, the block being formed to mate with a tool rest table or the like, and the feed screw being releasably clampable in the block by virtue of a pair of nut means spaced along its length, one fixed to the positioning block at its inboard surface, and the other threadably received on the feed screw but adapted to engage an outboard surface of the positioning block.

Grinding wheels develop certain surface imperfections after a period of use in shop or factory. These surface imperfections must be corrected by dressing the surface to a proper contour; if the grinding wheel is not periodically maintained in this manner, its working life is greatly reduced, it may produce damaged and unsatisfactory parts out of material worked on its surface, and it may become very unsafe for the user.

The usual tool employed is some type of steel mounting means provided with cutting diamonds at a cutting tip which is brought into contact with the grinding wheel surface. These tools range from single handheld bars up to complex and expensive attachments which mount on the grinding-wheel frame, and hold the cutting diamonds at an exact position. Unfortunately, the latter are too expensive and time consuming for use in many shops and factories, whereas the former, as heretofore known, have been crude, unsatisfactory, sometimes unsafe, and very likely to be wasteful of the expensive cutting diamonds.

An elaborate and expensive dressing tool could be constructed with a carriage mount, carrying cutting diamonds, and a trackway over which the carriage could be made to travel with great precision. Another desirable characteristic for a dressing tool is that the cutting diamond be precisely adjustable within a few hundredths of an inch, so that the exact desired engagement of the grinding wheel surface is achieved. Finally, dressing tools should provide bracing and clamping means for making certain that there is no vibration or chattering within the dressing tool during use. The latter is extremely damaging to the cutting diamonds, and also produces unwanted ripples and irregularities in the grinding-wheel surface.

It is an important object of The present invention to provide a manual dressing tool which possesses, in large measure, all the foregoing virtues.

The manual dressing tool of the present invention relies on the presence of a tool rest adjacent to the grinding wheel. Almost always, such tool rests are constructed as an integral part of the machine in which the grinding wheel rotates, and is constructed with a horizontal upper table surface upon which a worker may rest a workpiece, such as a lathe tool bit, as he sharpens it. It will be understood, however, that a suitable tool rest may be specially mounted adjacent any grinding wheel for the purpose of dressing it with the dressing tool of the present invention.

Normally, the tool rest is a table disposed substantially in or near a radial plane of the grinding wheel, but the actual plane of the tool rest may be a short distance above or below a true radial plane, depending upon the manner in which the grinding wheel is to be used. The term "adjacent a radial plane of said grinding wheel" is used herein to include the reasonably operable range, which is actually a very small fraction of the radius of the grinding wheel.

As will be seen from the following description of one preferred form of the invention, the dressing tool is designed to slide along the surface of the tool rest, as if the tool rest were a trackway for the dressing tool. Previously known dressing tools of this type have sometimes been dangerous to the operator, in the event that he slightly misjudged the degree of engagement of the diamond tip with the grinding wheel. Also, it will be appreciated that most of the manual dressing tools of the past have been extremely vulnerable to tool chatter. In the present invention, both of these difficulties are avoided, since the operator needs only to press the dressing tool into engagement with the tool rest table, after having adjusted and clamped the cutting diamond at exactly the right depth of cut. Chatter is eliminated or minimized since the feed screw which carries the cutting diamonds is anchored at the part of the dressing tool closest to the grinding wheel.

As a consequence of the rigidity provided by the dressing tool of the invention, several preferred forms of multiple diamond-cutting tips may be employed in the dressing tool.

The invention may best be understood from the following description of a preferred embodiment, which is illustrated in the accompanying drawings in which:

FIG. 1 is a perspective view of a cutting tool constructed in accordance with the invention, as seen looking obliquely at the inboard side, that is, the side presented to the grinding wheel;

FIG. 2 shows a side elevation of the dressing tool of FIG. 1, partly cross sectioned, positioned at rest on a tool rest table, with the cutting diamonds engaging the cylindrical sidewall of a grinding wheel;

FIG. 3 is a plan elevation view of the dressing tool and grinding wheel of FIG. 2;

FIG. 4 is an inboard elevation view, in fragment only, showing the anchoring inboard nut means; and FIG. 5 is a detail perspective view, partially sectioned, of the cutting-diamond end of the dressing tool of FIGS. 1 to 4.

In FIG. 1 the dressing tool is indicated generally by the numeral 10; its principal parts are a positioning block 11 and a feed screw 12. Although the dressing tool 10 may be constructed in several different sizes, all are intended to be handheld, and, consequently, will be limited in dimensions and weight to the size of a small hand tool. In its preferred form, positioning block 11 is T-shaped in cross section, as seen at the left side face 13, and is sufficiently massive to remain rigid, undeformed, and free from any resilient vibration, under the forces encountered in use.

Dressing tool 10 is shown in use in FIGS. 2 and 3, in which it is seen that positioning block 11 is held under manual pressure by the operator against a tool rest table 15, which is supported by means not illustrated but well known to those familiar with grinding wheels, in a position immediately adjacent to the cylindrical face 16 and plane side 17 of a grinding wheel 18, seen in fragmentary part, only. The plan view w of FIG. 3 reveals a typical L-plan construction, comprised of a front table structure 15a and a side table structure 15b. Typically, the upper surface 25 of the table 15 is perfectly horizontal and located just below the horizontal radial plane passing through the axis of the grinding wheel 18. The outer peripheral surfaces of table 15 are typically vertical planes 25a and 25b, disposed at right angles to one another, and parallel to horizontal lines in the two faces 16 and 17 of the grinding wheel 18.

In describing the dressing tool 10 and its relationship to the tool rest table 15, it will be convenient to refer to locations and surfaces closest to the grinding wheel 18 as being "inboard," while locations and surfaces directed outwardly from the grinding wheel may be referred to as "outboard.". Also, the tool 10 may be designated as having a longitudinal dimension parallel with the axis 26 of the feed screw 12, and transverse dimensions lying in planes normal to feed screw axis 26. Thus, the vertical edges 25a and 25b of the tool rest table 15 may be referred to as the outboard surfaces of the tool rest table.

It will be seen in FIGS. 1 to 3 that the feed screw 12 passes through the positioning block 11 by way of a longitudinal bore 28. The inboard end 29 of feed screw 12 is provided with a cutting diamond means 30, which engages the surfaces of the grinding wheel 18, as illustrated, for example, for the surface 16, in FIGS. 2 and 3. The outboard end of feed screw 12 is provided with an adjustment knob 31, which is preferably in the form of a cylindrical head of large diameter, coaxial with feed screw 12, and marked with micrometer indexing 32 to indicate by angle of turn the longitudinal advancement of the diamond cutting means 30 to or from the grinding wheel 18.

It will be seen from the partly sectioned view of FIG. 2 that the bore 28 is not internally threaded at its outboard part, and loosely receives feed screw 12. However, positioning block 11 is provided with internal threads 33 to accommodate the threads 34 of feed screw 12, at the inboard part of positioning block. A preferred construction of this is illustrated best in FIG. 1. It is seen that the leg of T-section 13 projects horizontally in an inboard direction, and that its inboard face 35 is recessed at 36 and 37, on each side of feed screw 12, so as to receive two half-nut inserts 36a and 37a, which are held in place by screws 36b and 37b. Preferably, the half-nut inserts 36a and 37b are made of a high quality and wear resistant steel, or other hard metallic material, capable of being machined to precise threading, and resistant to wear from the presence of particles which may be transferred from grindstone 18 to feed screw threads 34 during use of the dressing tool 10. Also, it will be seen from the construction described, that half-nut inserts 36a and 37b may be replaced by new inserts, if their internal threads become worn, without the necessity of discarding the entire tool 10.

A clamping nut 40 is threadably received on feed screw threads 34, on the part of feed screw 12 which projects in the outboard direction from positioning block 11. Preferably, clamping nut 40 is in the form of an enlarged cylinder with a knurled or ridged surface 41 so that fingers alone may be used fm rotating the clamping nut 40 to clamp or release the feed screw 12. A clamping washer 42 encircles the feed screw 12 between the clamping nut 40 and the outboard surface 43 of the positioning block 11. Clamping washer 42 is made of a resiliently compressible material with frictionally engaging surface, such as rubber, fiber, or similar nonmetallic and resiliently compressible material.

It will be seen from the foregoing, that feed screw 12 may be positioned to present cutting diamond means 30 at a desired inboard location by turning adjustment knob 31, while clamping nut 40 is backed off to an outboard released position. When cutting diamond means 30 is in the proper longitudinal position, the operator holds the positioning block 11 and the adjustment knob 31 to prevent relative rotation and tightens clamping nut 40 against clamping washer 42 and outboard surface 43, compressing washer 42, and clamping the feed screw 12 against rotational movement or chatter during use in dressing grinding wheel 18.

As shown in FIGS. 2 and 3, the operator applies the dressing tool 10 to the grinding wheel 18 by pressing it into engagement with the upper surface 25 and the outboard surface 25a of the tool rest table 15, and then sliding the tool 10 on the table 15 in a transverse direction, as indicated by the double headed arrow 50 in FIG. 3. Preferably, the sliding surfaces of dressing tool 10, comprising the horizontal surfaces 51a and 51b, and the vertical inboard surfaces 52a and 52b, have been machined into perfectly straight grooves 54 and ridges 55, to facilitate sliding action on table 15, despite the presence of grinding wheel particles, metal particles, or other debris.

An important feature of the dressing tool 10 is seen in FIG. 2, in that the feed screw 12 is almost as thick as the inboard projecting leg of positioning block 11, thus placing the diamond cutting means 30 on the grinding wheel 18 in substantially the same position as that occupied by a workpiece being ground while resting on tool rest table 15.

Diamond cutting means 30 may be constructed in many ways known to the prior art, as with a single central diamond, or a cluster of diamonds distributed over a central area in the inboard end 29 of feed screw 12. The construction of dressing tool 10, however, makes possible a preferred cutting diamond construction illustrated in the partially sectioned perspective view of FIG. 5. In that FIG., it will be seen that the inboard end 29 of feed screw 12 is hollow, and contains a series of cutting diamonds 71 and 72, for example, lying one behind the other along the axis 26, and held in place by an enveloping and bonding collar 73, which may be of sintered copper, or other material capable of securing diamonds 71 and 72 within the recess 74, with sufficient security to resist loss during use. As the dressing tool 10 is used over a long period of time, diamond 71, as well as the surrounding parts of mounting material 73, and inboard end 29, will be worn away. When this occurs, some grinding on inboard end 29 will slightly expose the second diamond 72, feed screw 12 can be advanced as already described, and the life of dressing tool 10 will begin ver again.

It is an important feature of the invention that the positioning block 11 supports the feed screw 12, by the inboard projecting leg of T'section 13, at the inboard face 35 of the positioning block, by means of the half-nut inserts 36a and 37a. Where the tool 10 is constructed with threads throughout the entire length of bore 28, there is a risk that the threads 34 of feed screw 12 will find clamping engagement and support near the outboard face 43. This may occur because of wear on threads near the inboard face 35. The undesirable consequence of such a situation is that feed screw 12 is actually cantilevered from a point near the outboard face 43, because of a slight clearance in the inboard threads. There is a danger that chatter may occur at the location of cutting diamonds 30. In the construction of the preferred embodiment illustrated, however, clamping action always locks the threads 34 of feed screw 12 at the inboard location of half-nuts 36a and 37a, thus providing assurance that the inboard projecting cantilever portion of feed screw 12 is minimum in length, regardless of wear which may occur on feed screw threads 34, or the threads of the half-nut inserts 36a and 37a.

I claim:

1. A dressing tool for the working surfaces of a grinding wheel, said grinding wheel being mounted for rotation adjacent a tool rest, said tool rest having a positioning surface disposed adjacent a radial plane of said grinding wheel, and an outboard surface substantially perpendicular to said positioning surface, said dressing tool comprising:

a positioning block formed with locating surfaces adapted to seat upon said positioning and outboard surfaces of said tool rest, said block having a bore passing through said block, said bore being substantially tangential to said positioning surface of said tool rest, and having its axis substantially normal to the desired surface of said grinding wheel;

a feed screw loosely received in said bore, said screw having an inboard end extending from said bore at said grinding wheel, and an outboard end extending from the opposite end of said bore;

nut means integral with said positioning block at the inboard end of said bore, said nut means threadably receiving said feed screw;

cutting diamond means mounted in the inboard end of said feed screw;

an adjustment knob on the outboard end of said feed screw; and clamping nut means on said feed screw between said positioning block and said adjustment knob, said means being adapted to releasably clamp said screw in said block when tightened into a position seating against said block.

2. A dressing tool as described in claim 1 in which said nut means is comprised of two replaceable half-nuts removably attached to said positioning block at its inboard surface.

3. A dressing tool as described in claim 1 in which said clamping nut means includes a clamping nut threadably received on said feed screw, and a clamping washer of resiliently compressible material, with frictionally resistent surfaces, said washer being received on said feed screw between said positioning block and said clamping nut.

4. A dressing tool as described in claim 1 in which said cutting diamond means is comprised of a plurality of cutting diamonds mounted in the inboard end of said feed screw, one behind the other along the axis of said feed screw, to provide a sequence of cutting diamond ends one after another as the inboard end of said feed screw is worn away by use.

5. A dressing tool as described in claim 1 in which said adjustment knob includes indexing marks on its cylindrical periphery which marks indicate the distance of advancement of the inboard end of said feed screw corresponding to the degree of rotation of said positioning knob.

6. A dressing tool as described in claim 1 in which said block is of T cross section, with the leg of the T directed horizontally in inboard direction, and the intersection of said leg and the crossarm portion of said T defining a right-angled guiding surface mating with the surfaces of said tool rest and said feed screw passes through said leg in a position substantially tangential to the upper surface of said tool rest.

7. A dressing tool as described in claim 1 in which the surfaces of said positioning block which are intended to contact said tool rest are provided with straight line alternate grooves and ridges, said grooves and ridges being aligned tranversely to the axis of said feed screw.